United States Patent [19]
Chinnock et al.

[11] 3,879,179
[45] Apr. 22, 1975

[54] METHOD AND APPARATUS FOR HANDLING DUST SEPARATED FROM GASES

[75] Inventors: Charles R. Chinnock; James B. Kaminski, both of Buffalo, N.Y.

[73] Assignee: National Steel Corporation, Pittsburgh, Pa.

[22] Filed: Jan. 25, 1974

[21] Appl. No.: 436,622

[52] U.S. Cl. ................... 55/1; 55/218; 110/165 R; 266/15
[51] Int. Cl. ............................................. B01d 46/00
[58] Field of Search .......... 55/1, 83, 84, 85, 93–95, 55/164, 218; 266/15; 110/119, 165 R

[56] References Cited
UNITED STATES PATENTS
3,315,443   4/1967   Marino .................................. 55/85

*Primary Examiner*—Bernard Nozick
*Attorney, Agent, or Firm*—Shanley, O'Neil and Baker

[57] ABSTRACT

A continuous system for separating dry dust from gases under superatmospheric pressure and handling separated dust by forming a slurry of the dust with water in a mixing and holding tank with provision for transferring the slurry to slurry thickening apparatus while at the same time maintaining the system gas tight against escape into the ambient atmosphere of the gases from which the dust is separated. The slurry can be continuously transferred by gravity from the tank, holding the desired back pressure on the tank by a liquid seal; the slurry can be continuously transferred from the holding tank through a throttling valve which maintains the desired back pressure on the holding tank; the slurry can be transferred in a batch manner under low superatmospheric pressure built up in the holding tank; or the slurry can be transferred under higher gas pressure for long line transmission to a slurry thickener; all with safety arrangements for keeping water out of the dry dust separating apparatus and for preventing the escape of gas.

49 Claims, 4 Drawing Figures

METHOD AND APPARATUS FOR HANDLING DUST SEPARATED FROM GASES

At present the top gas from metallurgical furnaces, such as iron blast furnaces, is passed into a dust catcher where reducing the velocity of the gas and changing its direction of flow removes from the gas stream about 60 to 75 per cent of the dust carried over from the furnaces. This separated dry dust collects in the bottom of the dust catcher and is fed to a pug mill in which the dust is moistened slightly to prevent the dust from blowing around the vicinity as it is transferred into a vehicle for removal. In practice this is still a dusty operation with danger of leakage of the highly combustible top gas into the atmosphere.

The effluent gas from the dust catcher passes on to a wet gas washer where the gas is thoroughly cleaned and the dust removed in slurry form for transferal to a slurry thickener and finally to a filtering apparatus to remove most of the water. In the case of a blast furnace operation, the product of the filtering step is fed to a sintering apparatus so the sintered product can be recycled into the blast furnace. Quite often the slurry from the wet gas washer has to be pumped up to a relatively high pressure in order to be transmitted a considerable distance to the thickening and filtering steps.

When the pug mill is down due to mechanical failure, or where the pug mill is not used, the dust has to be removed from the dust catcher by methods and means which are difficult and dangerous.

Applicants have solved the problems related to removal of dust from a dust catcher by forming a slurry of the dust in water in a separate mixing and holding tank located below the dust catcher. In applicants' method and apparatus, by the use of ingenious mechanical and electrical components, the dust is readily and safely handled in the form of a water slurry without pollution of the atmosphere in the vicinity of the dust catcher with dust and explosive gases while at the same time placing the recovered dust in a form which can be handled by a conventional thickener and filter system.

DESCRIPTION OF PREFERRED EMBODIMENTS OF THE APPARATUS OF THE INVENTION

Figure 1:
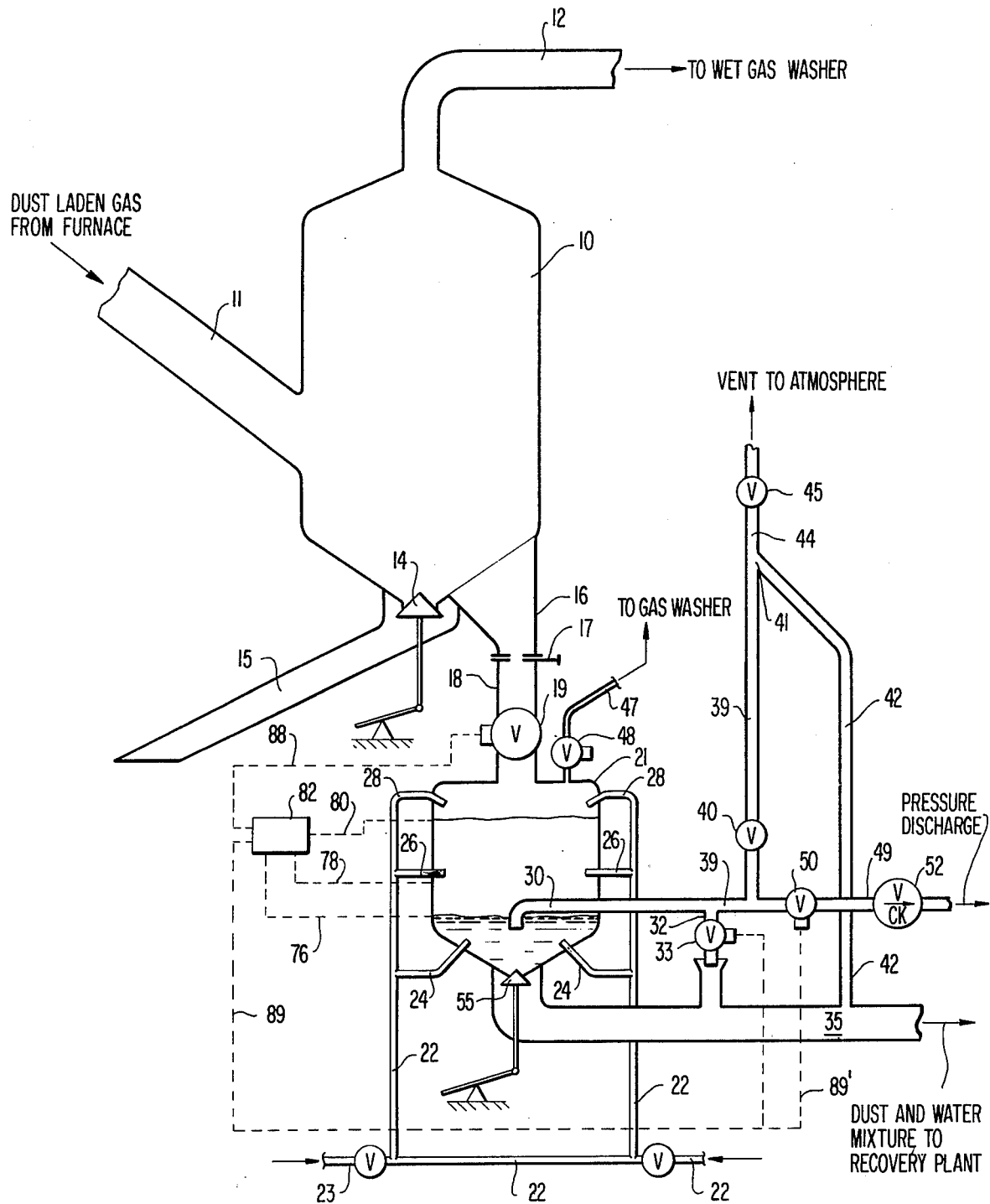
FIG. 1 is a purely diagrammatic view of apparatus for carrying out the method of the present invention and embodying the present invention and showing the relationship of the present invention to the conventional dust catcher of a conventional iron making blast furnace.

Referring to FIG. 1, the conventional dust catcher or dust separating chamber is shown at 10, having downcomer 11 for introducing into the dust catcher gas from the top of a blast furnace and a gas outlet shown at 12 for conducting effluent gases from the dust catcher to a wet gas washer, not shown. The construction of the dust catcher being conventional no details are shown other than a diagrammatic view of the bottom cone valve 14 which in conventional operation of the dust catcher permits dust to empty into dust chute 15 for delivering dust to a pug mill, where used, or into vehicles for removal. In the present invention the bottom cone valve 14 remains closed unless the system of the invention has to be shut down for some reason such as maintenance. Instead of the dust collecting in the bottom of dust catcher 10 for removal through chute 15, an opening is formed in the side of the dust catcher bottom cone which opens into a chute 16 which in turn opens into a conduit 18 closable by a goggle plate valve 17. Below goggle plate valve 17 is a rotary valve 19 which can be power operated to open and close conduit 18. Below valve 19 conduit 18 empties into a holding and mixing tank or receptacle 21 where the dust and water are mixed to form a slurry.

For forming the slurry in tank 21, water is supplied through a piping system 22 which supplies a plurality of injection lines at several levels of tank 21, lines 24 at a low level, lines 26 at an intermediate level and lines 28 at an upper level, the last being downwardly directed away from the opening of conduits 18. The nozzles in each case are designed and directed so as to keep the dust in suspension in the body of slurry in the tank and to scour the interior walls of the tank. Steam can be substituted for the water in pipe system 22 from a steam pipe 23.

Slurry is drawn off from tank 21 through conduit 30. Conduit 30 branches to form conduit 32 and conduit 39. Branch 32 is controlled by a power actuatable rotary valve 33 and conduit 33 empties into a gravity flow line 35 which conducts slurry at atmospheric pressure to a slurry thickening and dust recovery plant or any desirable dust processing equipment. Branch 39 is closable downstream of branch 32 by a cut-off valve 40 disposed in a vertical portion of conduit 39. Conduit 39 terminates at its upper end in a weir 41, overflow from the weir going into a downwardly directed conduit 42, conduit 42 opening into the gravity flow line 35. Conduit 39 above weir 41 is vented to atmosphere through a conduit 44 which prevents siphoning effect. Conduit 44 is closable by valve 45 where desired, as described below.

A vent line 47 closable by a power actuated valve 48 can be used to vent tank 21 to the gas washer.

Conduit 39 branches to form conduit 49 closable by a power actuated valve 50 so that if desired slurry under relatively high pressure can be conducted to a point downstream of conventional slurry pressure pumps required for transmission of the slurry a considerable distance to slurry processing equipment, such as a slurry thickener and a filtering system. A back flow penetration valve 52 is disposed in conduit 49 downstream of valve 50.

Bottom cone valve 55 of holding tank 21 is used for purging tank 21 when goggle plate valve 17 or rotary valve 19 is closed to shut the system down for cleaning.

Figure 2:
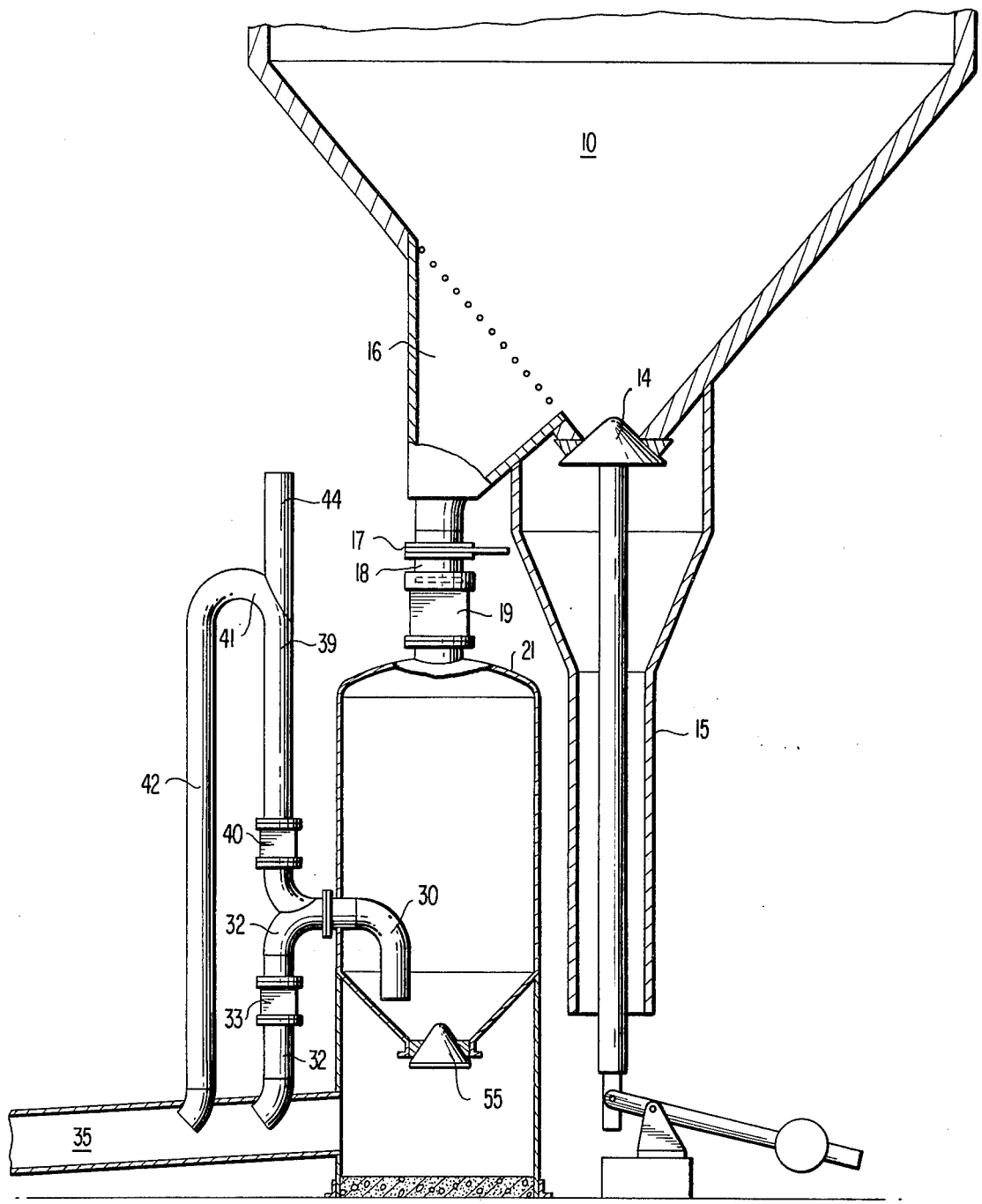
FIG. 2 is a partially diagrammatic side elevational view of a preferred embodiment of the apparatus of the present invention showing its relation to the lower end of the conventional dust catcher.
Figure 3:
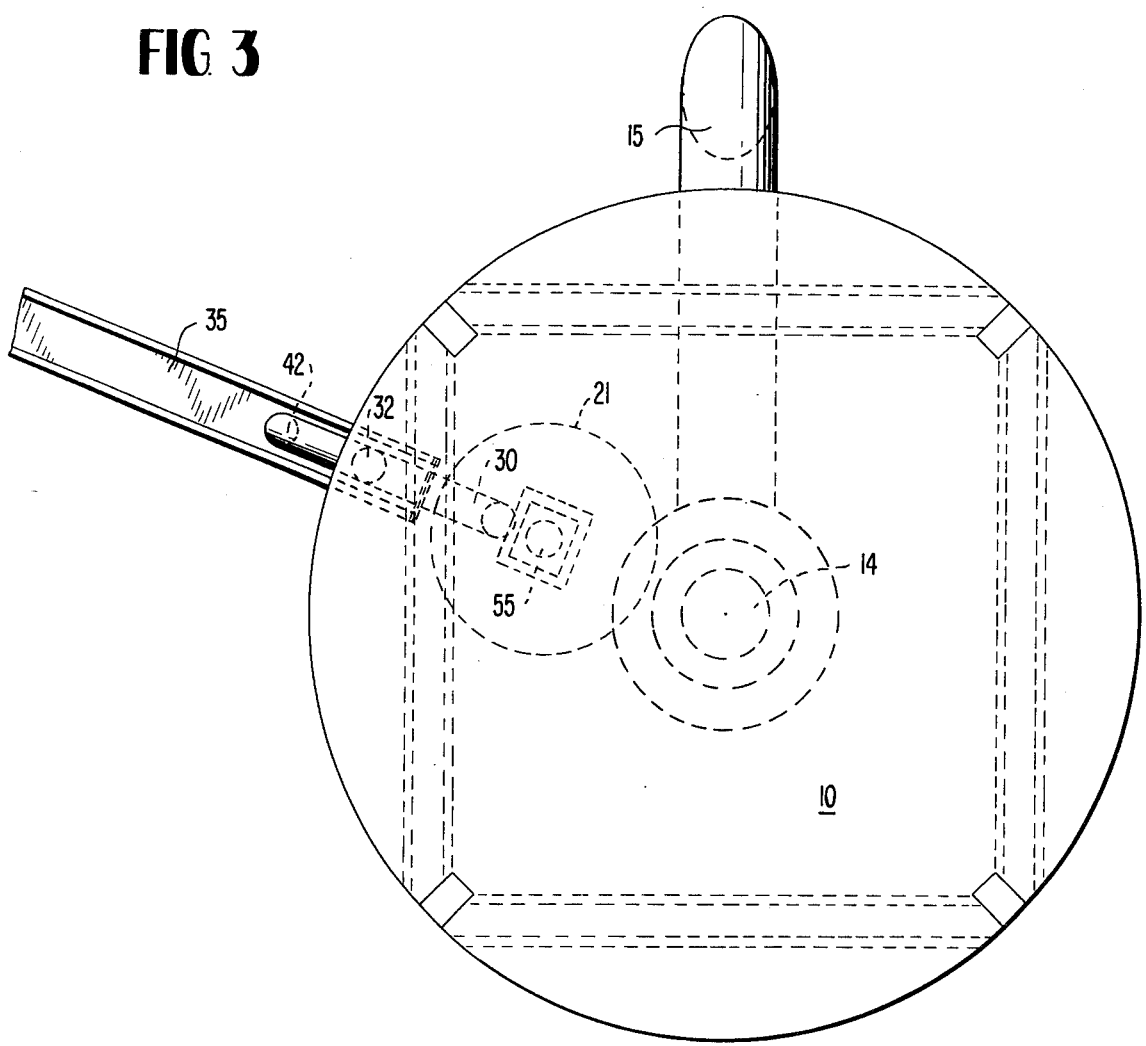
FIG. 3 is a partially diagrammatic plan view of the preferred embodiment of the apparatus of the present invention and the environmental structures.
Figure 4:
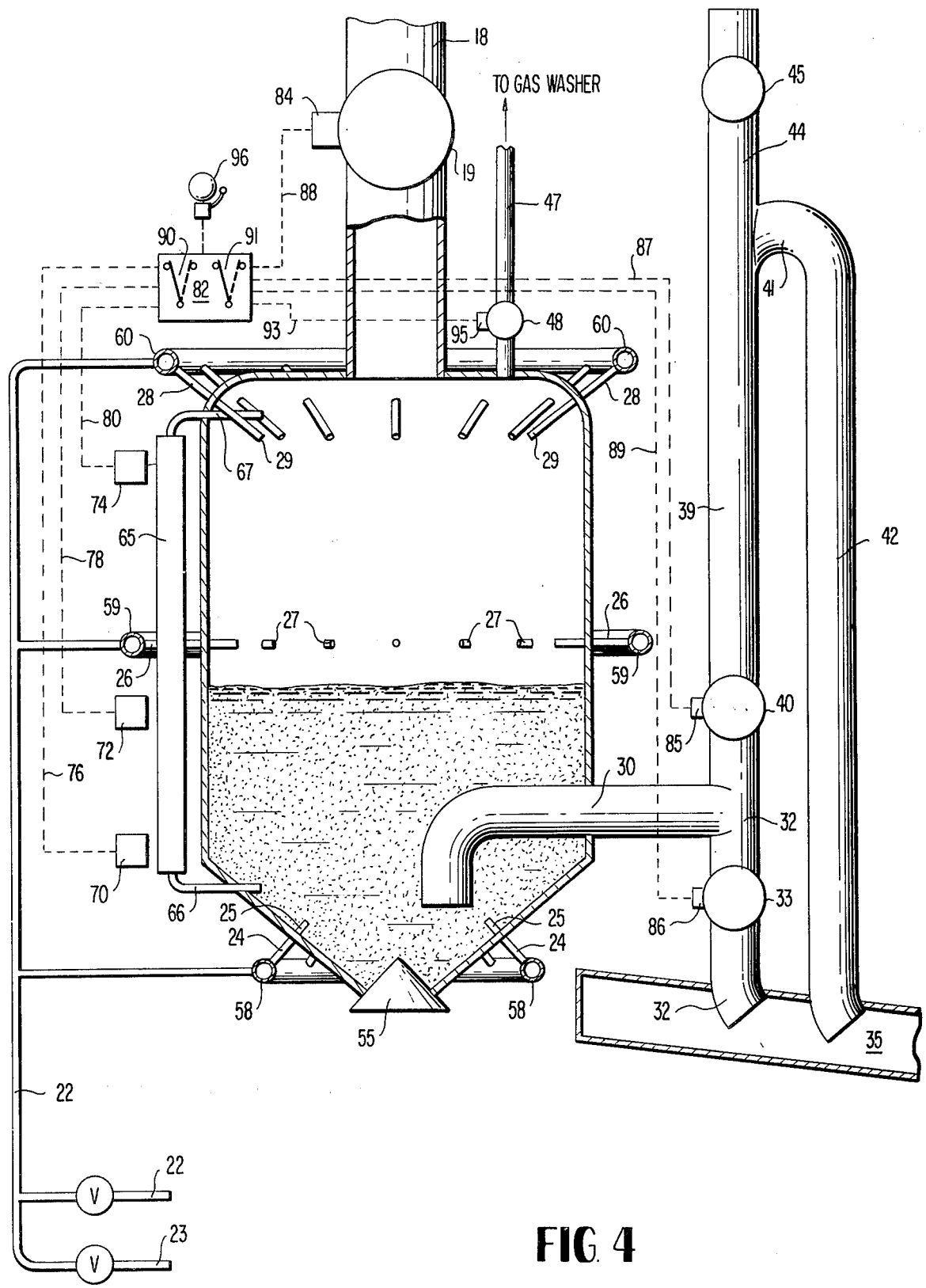
FIG. 4 is an enlarged diagrammatic view of the mixing and handling of the preferred embodiment showing the slurry level indicating devices and associated control circuits.

FIGS. 2, 3 and 4 show the presently preferred embodiment of the invention for carrying out the presently preferred variant of the method of the invention. Since FIGS. 2, 3 and 4 are merely fleshed out illustrations of some of the apparatus diagrammatically illustrated in FIG. 1, the same reference numerals are used in FIGS. 2, 3 and 4 to designate similar parts of the apparatus illustrated in FIG. 1. Further description of these similarly numbered parts is unnecessary also. The purpose of FIGS. 2 and 3 is to illustrate less diagrammatically than has been done in FIG. 1 the preferred form of apparatus incorporating the invention and for carrying out the method of the invention so that a person skilled in the art would have no difficulty in carrying out the invention.

In FIG. 4, the water injection nozzles and the water level control system are illustrated. Manifolds 58, 59 and 60 are shown supplying water to the water conduits 24, 26 and 28 and nozzles 25, 27 and 29. Although not specifically so shown, the nozzles 25, 27 and 29 may be somewhat tangentially directed so as to give a helical motion to the liquid in the tank thereby to achieve a better scouring action on the walls of the tank to maintain the dust in the slurry against settling. Water piping system 22 supplies water from a source to manifolds 58, 59 and 60 and a source of steam can be connected by pipe 23 to pipe system 22 to be substitsuted when desired for the water supplied to the manifolds or any of them using suitable valves.

Means for indicating the liquid level of the body of slurry in the tank are shown in FIG. 4 in the form of a sight gage 65 connected to the lowermost portion of the tank by conduit 66 and to the vapor space in the upper portion of the tank by conduit 67. Arranged alongside the vertical length of the sight gage are sensor devices 70, 72, 74 which can be any form of conventional apparatus. Each sensor means 70, 72 and 74 will generate a signal when the liquid level is contiguous to or above that unit. Thus sensor means 74 can be inactive until the liquid level in the sight gage comes into proximity to sensor means 74 at which time a signal can be generated. Sensor means 72 can be designed so that it is generating one type of signal at all times that the liquid level in the sight gage is contiguous to or above sensor means 72 and generating a different type of signal when the liquid level goes below sensor means 72. Sensor means 70 can be operated in the same way as sensor means 72 but in the reverse sense. Of course where desirable, or need be, sensor means 74 and 70 can be designed to correspond to sensor means 72. Electrical or fluid pressure lines 76, 78 and 80 connect sensor means 70, 72 and 74 respectively to a control apparatus 82. Valve 19 is power actuatable by a motor 84, valve 40 is power actuatable by a motor 85 and valve 33 is power actuatable by a motor 86. Control means 82 can be designed so that emission of a signal by sensor means 74 will send a signal through electrical or fluid pressure line 88 to operate motor 84 to close valve 19 and send a signal through electrical or fluid pressure lines 87 to open valve 40 or if valve 40 is already open to hold it open. On the other hand reception of one type of signal by control means 82 from sensor means 72 will send a signal through line 88 to open valve 19, or if it is open to hold it open. Cessation of reception of a signal from sensor means 70 by control means 82 will send a signal through electrical or fluid pressure line 87 to operate motor 85 to close valve 40.

With this manner of operation, initiation of a signal from sensor means 70 will not affect the operation of control means 82 nor will cessation of a signal from sensor means 74 do so. In other words, valve 19 and valve 40 when closed by sensor means 74 or 70, respectively, are held closed until opened by a different sensor means.

With switches 90, and 91 associaited with control means 82, in the solid line position shown in FIG. 4, electrical or fluid pressure lines 89 and 93 are not connected in the circuit and valves 33 and 48 are held in closed position by motors 86 and 95.

Movement of switch 91 from the solid line position to the dotted line position cuts lines 87 out of the circuit and connects in lines 89 and 93. With line 87 out of the circuit, motor 85 closes valve 40. This movement of switch 91 to the dotted line position further acts to connect sensor means 74 so that control means 82 in response to a signal from sensor means 74 not only closes valve 19 by means of line 88 but at the same time opens valve 33 by means of line 89 and may open or close valve 48 by means of line 93 and motor 95, depending on the method being carried out, as described below. The operation of sensor 72 remains unchanged. Finally with switch 91 in this new position, sensor unit 70 is connected so that control means 82 in response to cessation of a signal from sensor means 70 not only closes valve 33 but at the same time opens valve 19 and may open or close valve 48 depending on the method being carried out, as described below. It is to be noted that valve 33 is of the type that can have its open position limited so as to obtain a throttling action.

Under some circumstances line 93 can remain disconnected and valve 48 remains closed when switch 91 is moved to the dotted line position.

With switch 91, associated with control means 82, moved to the dotted line position shown in FIG. 4, sensor means 72 is cut out of the circuit, all of the connections, including the position of switch 90 in the dotted line position remaining unchanged.

As shown in FIG. 1, with valve 33 in closed position and utilizing the extension conduit 49 with a motor driven valve 50 for closing line 39, line 89' can control valve 50 so that the slurry can be injected into a high pressure conduit beyond check valve 52. Valve 48 would remain closed during this operation.

Where desired any alarm means such as the illustrated bell 96 can be used to indicate a failure in either the uppermost or lowermost liquid level safety arrangements.

DESCRIPTION OF THE VARIANTS OF THE METHOD OF THE INVENTION

There are four variants of the method of the invention all of which can be carried out in the apparatus illustrated in FIG. 1 and three of which can be carried out in the apparatus illustrated in FIGS. 2, 3 and 4. The first variant involves continuous disposal of the dust in slurry form by draining the slurry off under low superatmospheric pressure to a gravity flow line. The second involves continuous disposal of the dust in slurry form under low superatmospheric pressure through a throttling valve thence to disposal at atmospheric pressure to a gravity flow line. The third is a batch method for moving the dust in slurry form under low pressure to a gravity line. The fourth is a batch method in which the dust in slurry form under high pressure is injected into a relatively high pressure slurry transmission line leading to a disposal plant at some distance.

In all variants of the method of the invention, dust laden gas from the top of a furnace such as an iron-producing blast furnace enters dust catcher 10 through downcomer 11. Approximately 60 to 75% of the dust, depending upon the type of ores used and the blast volume of the furnace, separates out in the dust catcher and falls to the bottom cone of the dust catcher. Conventional bottom cone valve 14 of the dust catcher is maintained closed in normal operations of the present invention and is opened only when the present invention is out of use for maintenance or failure of some portion. With the present invention in use the separated dry dust arriving in the bottom cone falls into dust collector or chute 16 and thence through the open goggle plate valve 17, conduit 18 and rotary valve 19 into mixing and holding tank 21. The goggle plate valve is used to shut off conduit 18 when rotary valve 19 or conduit 18 has to be worked on or replaced. Goggle plate valve 17 incorporates a goggle plate which is an elongated plate having an opening about the size of the internal cross-section of conduit 18 and having an imperforate portion extending outside of the flanges which hold the plate in the valve open position with the orifice lined up with conduit 18. To close the valve numerous bolts must be removed and the plate pivoted around so that the imperforate portion of the plate closes conduits 18. The nuts and bolts are then replaced and the system is operated with disposal of the dry dust through bottom cone valve 14 and conventional dust chute 15. Rotary valve 19 is a conventional power operated valve of large dimensions and can be operated by electrical power or fluid under pressure.

The dry dust falling into mixing and holding receptacle 21 is mixed with water entering the receptacle through nozzles 25, 27 and 29 to form a slurry which is kept in motion by the force of the water injected through the nozzles and by their direction so as to prevent the dust from settling. Valve 55 at the bottom of receptacle 21 is maintained closed during normal operation and may be opened periodically to remove any collection of heavy dust particles which cannot be maintained suspended in the slurry. The amount of water supplied to receptacle 21 is designed to be that amount of water needed to draw off the separated dry dust in slurry form considering the gas pressures present and with properly designed conduits.

The foregoing being common to all four variants of the method of the invention, the variants will now be described wherein they differ.

In respect to the first variant, best shown in FIGS. 1 and 4, with switches 90 and 91 of control means 82 in the positions shown in solid lines, line 87 is connected into the control circuit to control the opening and closing of valve 40, line 89 disconnected so that valve 33 is closed. Valves 48 and 50 (the latter shown only in FIG. 1) are in closed position. With valve 40 in open position the height of conduit 49 to the weir 41 is designed so that the weight of the column of slurry in conduits 39 and 44 acting on the body of slurry in receptacle 21 will balance the desired superatmospheric pressure in the vapor space above the liquid level in receptacle 21, which pressure will be the desired back pressure on the dust catcher and in turn blast furnace top. The column of slurry in conduits 39 and 44 is subjected to atmospheric pressure through the open end of conduit 44, conduit 44 at the same time acting to permit a desired rise and fall in the height of the slurry above the weir to balance the rise and fall of the slurry liquid level in tank 21 and thereby maintain flow of slurry over the weir into conduit 42. Thus the slurry will be drawn off from holding tank 21 at a rate determined by the pressure differential present between the gas pressure in the holding tank and atmospheric pressure and by the rate of formation of slurry. Conduit 42 empties into an open, sloping slurry carrying line 35 which leads the slurry off by gravity to a point of disposal.

In operating this variant of the method two safety features are incorporated as best illustrated in FIG. 4. If the liquid level of the slurry in mixing and holding tank 21 were to rise to such an extent as to enter conduit 18 or even dust catcher 10, the system of the present invention would be put out of order, in the first instance by conduit 18 plugging up, and in the case of the slurry entering dust catcher 10, the dust catcher would be put out of commission which would mean shutting down the blast furnace. Since an iron-making blast furnace is the heart of a steel plant, it is inconceivable that a dust handling system should shut down a blast furnace. Therefore, when the slurry liquid level reaches a dangerous height in tank 21, sensor means 74 is actuated and control means 82, with switches 90 and 91 in the positions indicated in solid lines, acts to energize motor 84 to close valve 19. Since water continues to flow through nozzles 25, 27 and 29 into tank 21, the pressure in tank 21 builds up and as a result more slurry flows through withdrawal conduit 30, and to a greater height in vertical conduits 39 and 44, more slurry flows over weir 41 into conduit 42 and disposal conduit 35. When the slurry liquid level in tank 21 goes down to the intermediate level of sensor 72, sensor means 72 emits a type of signal which causes control means 82 to energize motor 84 to open valve 19 and normal operation resumes. If the undesired rise in liquid level was due to too much water injection, the water supply is reduced. If the rise in slurry liquid level was due to an obstruction in the system, the increased pressure should clear the obstruction and valve 45 can be closed so that the pressure can be applied to conduit 42, if need be. If in the latter case clearance did not take place, the system of the present invention would have to be closed down for cleaning and the conventional bottom cone valve 14 and dust disposal chute 15 be put in service. However, as pointed out below, the system of the invention may be purged by high pressure steam without a shut down requiring going back to conventional operation.

The second safeguard is to prevent the slurry liquid level from going so low that blast furnace gases escape through conduits 30, 39, 42 and 44 to the atmosphere or in other words to keep the slurry liquid level from sinking so low as to lose the liquid seal on tank 21. Since blast furnace gas is inflammable, this would be a very dangerous situation. To provide against this eventuality, sensor means 70 is positioned at the height of the lowest safe slurry liquid level and when this level is reached sensor means 70 acting through control means 82 and line 87 energizes motor 85 to close valve 40. Since the slurry can no longer leave and water continues to flow into tank 21 through nozzles 25, 27 and 29, the emergency situation is no longer present. When the slurry liquid level rises to the level of sensor means 72, sensor means 72 emits the type of signal which causes control means 82 to energize motor 85 to open valve 40. This type of low slurry level situation can result from a temporary high pressure in the blast furnace due to a "slip" of the burden or some other condition in the blast furnace causing an increased furnace top pressure or this condition can result from insufficient water supply to tank 21. Such a blast furnace condition is temporary and corrects itself. If the water supply is insufficient it is increased.

At times it may be desirable to purge the system with pressures higher than the water pressure and in such case the water supply through conduit 22 is cut off and a high pressure steam supply is connected to the water pipe sytem from conduit 23. In the case of this variant of the method of the invention, the introduction of steam through nozzles 25, 27 and 29 or any of them is confined to those periods when valve 19 is closed temporarily and the apparatus is being cleaned out.

The second variant of the method of the present invention is similar to the first variant but in the second variant the back pressure applied to the body of slurry in tank 21 through conduit 30 is achieved by throttling valve 33 instead of by utilizing a head of liquid slurry in vertical conduit 39. Nevertheless the slurry is still drawn off from tank 21 under the influence of the pressure differential between the pressure in tank 21 and atmospheric pressure and by the rate of formation of the slurry. In this variant switch 91 is moved into the dotted line position shown in FIG. 4 to disconnect line 87 from control means 82 and connect in line 89 thereby closing valve 40. Switch 90 at this point remains in the full line position and this same new position of switch 91 does not affect the relationship of control means 82 and sensor means 70, 72 and 74. Power actuatable valves such as valve 33 can be adjusted so as to have a limited opening while still being actuatable by a motor into fully closed position. In this variant of the method valve 33 is adjusted by trial and error to a limited open position which will result in a desired throttling action on slurry passing through conduit 32. With the proper amount of water being injected into tank 21 and the proper throttling action in valve 33, the slurry will be carried out of tank 21 through conduit 30 and conduit 32 into gravity flow conduit 35 at the rate the slurry is formed in the tank 21. If the slurry level in tank 21 rises to a dangerous level or sinks to a dangerous level sensor means 74 and 70, respectively, will act in the same manner as in the first variant except that cessation of a signal from sensor means 70 will cause control means 82 to energize motor 86 to close valve 33. Sensor means 72 will act as in the first variant to open valves 19 and 33 when the slurry level reaches a safe level.

The third variant of the method of the present invention utilizes the idea of periodically discharging the slurry from the tank 21 by holding valve 33 closed until tank 21 is full of slurry, then closing valve 19 and simultaneously opening valves 33 and 48 to discharge the contents of tank 21 through conduits 30, 32 and 35. In this method switch 91 is retained in the dotted line position and switch 90 is also moved to the dotted line position, cutting sensor means 72 out of the circuit. Starting with valves 33 and 48 closed and valve 19 open, as the level of the slurry in tank 21 rises and reaches the level of sensor means 74, that sensor means actuates control means 82 to close valve 19 and open valves 33 and 48. Tank vent lines 47, which is connected to the gas washing apparatus, permits sufficient gas at the superatmospheric pressure of the gas system to back flow into tank 21 to force the slurry from tank 21 through conduits 30 and 32. The small diameter of vent line 47 restricts flow of gas through the line to a harmless extent, whichever way it flows. When the slurry liquid level gets down to the level of sensor means 70, this sensor means acting through control means 82 and line 89 closes valves 33 and 48 and opens valve 19. This cycle is then repeated. In this variant valve 33 can be fully open in the open position and not throttled. This variant can also be carried out without closing valve 19 at all unless the level of slurry in tank 21 goes too high. In such case sensor means 72 can be connected back in circuit and placed at a higher level but below sensor means 74 and sensor means 72 used to open valve 33 instead of valve 19, sensor means 74 being reversed for closing valve 19 if the slurry level gets dangerously high. Thus, by moving switch 90 back into the full line position, sensor means 72 can be connected back into the circuit for this purpose. With this method vent line 47 would not be needed and valve 48 could be maintained closed.

The fourth variant of the method of the present invention (see FIG. 1) is similar to the third variant in that it is a batch method but in this variant the pressure in holding tank 21 used to transfer slurry must be greater than the pressure on the upstream side of check valve 52 in order to transfer the slurry to the high pressure transmission line taking the slurry a considerable distance to slurry processing apparatus.

In this variant, referring still to FIG. 1, valve 33 is disconnected from control means 82 and is maintained in closed position while valve 50 is operated by control means 82 through line 89'. Starting with valve 50 closed and valve 19 open, holding tank 21 is allowed to fill with slurry due to accumulation of separated dust and injection of water through conduits 24, 26 and 28. When the slurry level reaches the height of sensor means 74, control means 82 closes valve 19 and opens valve 50. Continued injection of water raises the pressure in holding tank 21 and the pressure rises until it is sufficient to open check valve 52 and thereby inject slurry into the high pressure slurry line 53. Since the continued injection of water acts to dilute the slurry further, which water must be later separated from the thickened slurry in the filtering step, high pressure steam from steam source conduit 23 can be substituted for the water to raise the pressure on the body of slurry in holding tank 21. When the level of the slurry in tank 21 reaches that of sensor means 70, control means 82 is activated to close valve 50. A timed delay means keeps valve 19 closed while valve 48 opens to relieve the pressure in tank 21 through vent line 47. Valve 19 then opens and the cycle is repeated.

It will be understood that the embodiments and variants of the invention shown and described are for purposes of illustration and that the invention comprehends other arrangements and modifications within the scope of the appended claims.

We claim:
1. Apparatus for collecting dry dust and handling the same comprising
   a. chamber means for separating dust from gas under superatmospheric pressure,
   b. means for supplying water,
   c. means for mixing dust with water including holding receptacle means for holding the resulting slurry of dust and water,
   d. conduit means connecting the chamber means with the holding receptacle means for conducting dust from the chamber means to the holding receptacle means and imposing the superatmospheric gaseous pressure of the chamber means on the surface of the body of slurry in the holding receptacle means, the conduit means being the sole means of access of dust to the holding receptacle means above the surface of the body of slurry in the holding receptacle means, e. valve means for opening and closing the conduit means, f. slurry withdrawal conduit means connected to the holding receptacle means at a point near the lower end of the holding receptacle means, the slurry withdrawal conduit means including an upwardly extending portion extending to a point above the highest possible level of the body of slurry in the holding receptacle means and being open to the atmosphere at that point, g. overflow means connected to the upwardly extending portion of the slurry withdrawal conduit at said point for collecting slurry passing through the slurry withdrawal conduit and past said point, h. conduit means connected to the overflow means for passing slurry from the overflow means to a slurry processing apparatus, and i. shut-off valve means for closing slurry withdrawal conduit means (f) below said point.

2. The apparatus of claim 1 including j. second slurry withdrawal conduit means connected to first claimed slurry withdrawal conduit means (f) at a point lower than the upwardly extended portion of first claimed slurry withdrawal conduit means (f), k. shut-off valve means for closing the upwardly extending portion of the first claimed slurry withdrawal conduit means, and l. fully closable throttling valve means for controlling the second slurry withdrawal conduit means.

3. The apparatus of claim 1 including j. means for indicating a predetermined maximum slurry level in the holding receptacle means, k. means for indicating a predetermined lower slurry level in the holding receptacle means, l. means responsive to an indication of maximum slurry level acting to close valve means (e), and m. means responsive to an indication of lower slurry level acting to open valve means (e).

4. The apparatus of claim 1 including j. means for indicating a predetermined minimum slurry level in the holding receptacle, and k. means responsive to an indication of minimum slurry level acting to close valve means (i).

5. The apparatus of claim 1 in which j. the means for supplying water includes means for injecting the water into the holding receptacle means at a point below the surface of the body of slurry to keep the dust in suspension in the slurry in the holding receptacle means.

6. The apparatus of claim 1 including j. means for injecting steam into the holding receptacle means to raise the pressure on the surface of the body of slurry in the holding receptacle means when valve means (e) are closed.

7. The apparatus of claim 1 including j. conduit means extending above said overflow means, the lower end of conduit means (j) being in communication with the overflow means and with the atmosphere at a higher point for receiving and containing a body of slurry rising above the overflow point and resting on the slurry in the slurry withdrawal conduit.

8. The apparatus of claim 2 including k. means for indicating a predetermined high slurry level in the holding receptacle, l. means for indicating a predetermined intermediate slurry level in the holding receptacle, m. means responsive to an indication of high slurry level acting to close valve means (e), and n. means responsive to an indication of intermediate slurry level acting to open the valve means (e).

9. The apparatus of claim 2 including k. means for indicating a predetermined minimum slurry level in the holding receptacle, and l. means responsive to an indication of minimum slurry level acting to close valve means (i).

10. The apparatus of claim 2 including k. the means for supplying means including means for injecting the water into the receptacle at a point below the surface of the body of slurry to keep the dust in suspension in the slurry in the holding receptacle means.

11. The apparatus of claim 2 including k. means for injecting steam into the holding receptacle means to raise the pressure on the surface of the body of slurry in the holding receptacle means.

12. Apparatus for collecting dry dust and handling the same comprising a. chamber means for separating dust from gas under superatmospheric pressure, b. means for supplying water, c. means for mixing dust with water including receptacle means for holding the resulting slurry of dust and water, d. conduit means connecting the chamber means with the holding receptacle means for conducting dust from the chamber means to the holding receptacle means and imposing the superatmospheric gaseous pressure of the chamber means on the surface of the body of slurry in the holding receptacle means, the conduit means being the sole means of access of dust to the holding receptacle means above the surface of the body of slurry in the holding receptacle means, e. valve means for opening and closing the conduit means, f. slurry withdrawal conduit means connected to the holding receptacle means at a point near the lower end of the holding receptacle means, g. means associated with the slurry withdrawal conduit means for controlling flow of slurry through the slurry withdrawal conduit, h. conduit means connected to the withdrawal conduit means downstream of means (g) relative to slurry flow for passing slurry to a slurry thickener apparatus.

13. The apparatus of claim 12 including i. means for indicating a predetermined maximum slurry level in the holding receptacle, j. means for indicating a predetermined high slurry level in the holding receptacle, k. means for indicating a predetermined minimum slurry level in the holding receptacle, l. means responsive to an indication of maximum slurry level acting to close valve means (e), m. means responsive to an indication of high slurry level acting to open means (g), and n. means responsive to an indication of minimum slurry level acting to close means (g).

14. The apparatus of claim 12 including
i. means for indicating a predetermined high slurry level in the holding receptacle,
j. means for indicating a predetermined intermediate slurry level in the holding receptacle,
k. means responsive to an indication of high slurry level acting to close valve means (e), and
l. means responsive to an indication of intermediate slurry level acting to open valve means (e).

15. The apparatus of claim 12 including
i. means for indicating a predetermined minimum slurry level in the holding receptacle, and
j. means responsive to an indication of minimum slurry level acting to close means (g).

16. The apparatus of claim 12 in which
i. the means for supplying water include means for injecting the water into the receptacle at a point below the surface of the body of slurry to keep the dust in suspension in the slurry in the holding receptacle means.

17. The apparatus of claim 12 including
i. means for injecting steam into the holding receptacle means to raise the pressure on the surface of the body of slurry in the holding receptacle means when valve means (e) are closed.

18. The apparatus of claim 12 in which
i. means are associated with means (g) making means (g) adjustable to obtain a desired throttling action in means (g) to control the rate of withdrawal of the slurry from the holding tank.

19. The apparatus of claim 18 including
j. means for indicating a predetermined high slurry level in the holding receptacle,
k. means for indicating a predetermined intermediate slurry level in the holding receptacle,
j. means responsive to an indication of high slurry level acting to close valve means (e), and
m. means responsive to an indication of intermediate slurry level acting to open valve means (e).

20. The apparatus of claim 18 including
j. means for indicating a predetermined minimum slurry level in the holding receptacle, and
k. means responsive to an indication of minimum slurry level acting to close means (g).

21. The apparatus of claim 18, in which
j. the means for supplying water include means for injecting the water into the receptacle at a point below the surface of the body of slurry to keep the dust in suspension in the slurry in the holding receptacle means.

22. The apparatus of claim 18 including
j. means for injecting steam into the holding receptacle means to raise the pressure on the surface of the body of slurry in the holding receptacle means when valve means (e) are closed.

23. The apparatus of claim 12 including
i. high pressure slurry transmission conduit means interposed between the means (g) and the thickener apparatus, and
j. check valve means between the high pressure slurry transmission conduit means and the holding receptacle means for preventing back flow of slurry from the high pressure slurry transmission conduit means to the holding receptacle.

24. The apparatus of claim 12 including
i. means for indicating a predetermined high slurry level in the holding receptacle,
j. means for indicating a predetermined low slurry level in the holding receptacle,
k. means responsive to an indication of high slurry level acting to close valve means (e) and open valve means (g) and
l. means responsive to an indication of low slurry level acting to open valve means (e) and close means (g).

25. The apparatus of claim 24 in which
k. the means for supplying water includes means for injecting the water into the receptacle at a point below the surface of the body of slurry to keep the dust in suspension in the slurry in the holding receptacle means.

26. The apparatus of claim 24 including
k. means for injecting steam into the holding receptacle means to raise the pressure on the surface of the body of slurry in the holding receptacle means.

27. Method for collecting dry dust and handling the same comprising
a. continuously separating dust from dust laden gases under superatmospheric pressure,
b. forming a slurry of dust in water and collecting slurry in a receptacle closed to the ambient atmosphere but open to a superatmospheric gaseous pressure, the slurry forming a body of slurry having a surface exposed to superatmospheric gaseous pressure,
c. adding water to the receptacle for the formation of slurry and keeping the dust in suspension in the body of slurry by injection of the water into the receptacle under a pressure greater than the gaseous superatmospheric pressure on the exposed surface of the body of slurry, at least some of the water being injected below the exposed surface of the body of slurry,
d. forming a column of slurry supported on the body of slurry in the receptacle, the top surface of the slurry in the column being exposed to atmospheric pressure, the column of slurry extending above the level of the exposed surface of the body of slurry in the receptacle to a predetermined height such as to act as a controlling factor on the level of the exposed surface of the body of slurry in the receptacle,
e. drawing off slurry by gravity from the top of the column of slurry at and above the predetermined height at a rate determined by the pressure differential between the superatmospheric gaseous pressure on the exposed surface of the body of slurry and atmospheric pressure and by the rate of formation of slurry in the receptacle and
f. passing slurry so drawn off to a slurry processing step.

28. A method as claimed in claim 27 including
g. predetermining an upper limit and an intermediate point for the level of the exposed surface of the body of slurry in the receptacle,
h. increasing the gaseous pressure on the exposed surface of the body of slurry when the level of the body of slurry reaches the upper limit to increase the pressure differential between the pressure on the surface of the body of slurry and atmospheric pressure and increase the rate of slurry drawn off from the receptacle, and i. lowering the gaseous pressure on the exposed surface of the body of slurry when the level of the body of slurry reaches the intermediate point.

29. The method claimed in claim 28 in which j. the gaseous pressure on the exposed surface of the body of slurry is increased by sealing off the receptacle above the level of the exposed surface of the body of slurry and continuing to inject water under a pressure greater than the gaseous pressure on the exposed surface of the body of slurry in the receptacle at the time the body of slurry reaches the upper limit.

30. The method of claim 28 in which j. the dust is separated from the gases in a chamber and dust is transferred to the receptacle by conduit means constituting the only means of access of dust to the receptacle above the level of the exposed surface of the body of slurry and the receptacle is sealed off by closing the conduit means, k. the gaseous pressure on the surface of the body of slurry is lowered by opening the conduit means.

31. The method of claim 28 in which j. the gaseous pressure on the exposed surface of the body of slurry is increased by sealing off the receptacle above the level of the exposed surface of the body of slurry and injecting into the receptacle steam under a pressure greater than the gaseous pressure on the exposed surface of the body of slurry in the receptacle at the time the level of the body of slurry reaches the upper limit.

32. The method of claim 31 in which k. the dust is separated from the gases in a chamber and dust is transferred to the receptacle by conduit means constituting the only means of access of dust to the receptacle above the level of the exposed surface of the body of slurry and the receptacle is sealed off by closing the conduit means, l. the gaseous pressure on the surface of the body of slurry is lowered by opening the conduit means.

33. Method for collecting dry dust and handling the ıme comprising a. continuously separating dust from dust laden gases under superatmospheric pressure, b. forming a slurry of dust in water and collecting slurry in a receptacle closed to the ambient atmosphere but open to a superatmospheric gaseous pressure, the slurry forming a body of slurry having a surface exposed to superatmospheric gaseous pressure, c. adding water to the receptacle for the formation of slurry, d. withdrawing slurry through conduit from a point in the receptacle below the exposed surface of the body of slurry, e. with the surface of the body of slurry in the receptacle exposed to superatmospheric gaseous pressure throttling the flow of slurry through the conduit to maintain a flow rate through the conduit which will maintain the level of the exposed surface of the slurry in the receptacle at a level above the point of withdrawal of the slurry from the receptacle and below a point at which the receptacle will overflow, and f. passing withdrawn slurry to a slurry processing step.

34. The method claimed in claim 33 including g. predetermining an upper limit and an intermediate point for the level of the exposed surface of the body of slurry in the receptacle, h. increasing the gaseous pressure on the exposed surface of the body of slurry when the level of the body of slurry reaches the upper limit, and i. lowering the gaseous pressure on the exposed surface of the body of slurry when the level of the body of slurry reaches the intermediate point.

35. The method claimed in claim 34 in j. the gaseous pressure on the exposed surface of the body of slurry is increased by sealing off the receptacle above the level of the exposed surface of the body of slurry and continuing to inject water under a pressure greater than the gaseous pressure on the exposed surface of the body of slurry in the receptacle at the time the body of slurry reaches the upper limit.

36. The method of claim 35 in which k. the dust is separated from the gases in a chamber and dust is transferred to the receptacle by conduit means constituting the only means of access of dust to the receptacle above the level of the exposed surface of the body of slurry and the receptacle is sealed off by closing the conduit means, l. the gaseous pressure on the surface of the body of slurry is lowered by opening the conduit means.

37. The method claimed in claim 34 in which j. the gaseous pressure on the exposed surface of the body of slurry is increased by sealing off the receptacle above the level of the exposed surface of the body of slurry and injecting into the receptacle steam under a pressure greater than the gaseous pressure on the exposed surface of the body of slurry in the receptacle at the time the level of the body of slurry reaches the upper limit.

38. The method of claim 37 in which k. the dust is separated from the gases in a chamber and dust is transferred to the receptacle by conduit means constituting the only means of access to the receptacle above the level of the exposed surface of the body of slurry and the receptacle is sealed off by closing the conduit means, l. the gaseous pressure on the surface of the body of slurry is lowered by opening the conduit means.

39. Method for collecting dry dust and handling the same comprising a. continuously separating dust from dust laden gases under superatmospheric pressure, b. forming a slurry of dust in water and collecting slurry in a receptacle closed to the ambient atmosphere but open to superatmospheric gaseous pressure, the slurry forming a body of slurry having a surface exposed to superatmospheric gaseous pressure, c. adding water to the receptacle for the formation of slurry, d. providing conduit means for withdrawing slurry from the body of slurry in the receptacle, e. providing openable and closable valve means for controlling flow of slurry through the conduit means, f. predetermining an upper limit and a lower limit for the level of the exposed surface of the body of slurry in the receptacle, g. opening valve means (e) to cause slurry to flow from the body of slurry in the receptacle under the influence of the superatmospheric gas pressure on the exposed surface of the body of slurry when the level of the body of slurry reaches the upper limit, h. closing valve means (e) to stop flow of slurry from the body of slurry in the receptacle when the level of the body of slurry reaches the lower limit, i. repeating the cycle of the last claimed two steps and j. passing slurry from the conduit means to a slurry processing step 40. The claim of claim 39 in which k. the dust is separated from the gases in a chamber and dust is transferred to the receptacle by second conduit means constituting the only means of access of dust to the receptacle above the level of the exposed surface of the body of slurry, and l. means are provided for closing the second conduit means to stop transfer of dust to the receptacle, m. the second conduit means are closed at the time valve means (e) are opened.

41. The method of claim 40 in which n. high pressure steam is injected into the receptacle simultaneously or after step (g) to cause the slurry to flow from the body of slurry in the receptacle.

42. Method for collecting dry dust and handling the same comprising a. continuously separating dust from dust laden gases under superatmospheric pressure, b. forming a slurry of dust in water and collecting slurry in a receptacle closed to the ambient atmosphere but open to a superatmospheric gaseouss pressure, the slurry forming a body of slurry having a surface exposed to superatmospheric gaseous pressure, c. providing conduit means for withdrawing slurry from the body of slurry in the receptacle, d. providing a shut-off valve means for opening and closing the conduit means, e. closing the shut-off valve means when the level of slurry in the receptacle is low, f. continuing the formation of slurry in the receptacle until a high level of slurry in the receptacle is reached, g. sealing off the receptacle above the high level of slurry, h. raising the gas pressure on the surface of the body of slurry until a desired pressure is reached, i. maintaining a pressure on the body of slurry of at least the desired pressure, j. simultaneously with or after step (g) and before step (k) opening the shut-off valve, k. when the pressure on the body of slurry has forced slurry out of the receptacle to thereby lower the level of slurry to a desired low level closing the shut-off valve, i. repreating the cycle.

43. The method of claim 42 in which l. back flow of slurry from the conduit means into the receptacle is prevented.

44. The method of claim 42 in which l. the gaseous pressure on the exposed surface of the body of slurry in the receptacle is increased by injection of water into the receptacle.

45. The method of claim 44 in which m. back flow of slurry from the conduit means into the receptacle is prevented.

46. The method of claim 42 in which l. the gaseous pressure on the exposed surface of the body of slurry in the receptacle is increased by injection of steam into the receptacle.

47. The method of claim 46 in which m. back flow of slurry from the conduit means into the receptacle is prevented.

48. Method for collecting dry dust and handling the same comprising a. continuously separating dust from dust laden gases under superatmospheric pressure, b. forming a slurry of dust in water and collecting slurry in a receptacle closed to the ambient atmosphere but open to a superatmospheric gaseous pressure, the slurry forming a body of slurry having a surface exposed to superatmospheric gaseous pressure, c. adding water to the receptacle for the formation of a slurry, d. withdrawing slurry from the receptacle into the ambient atmosphere through a conduit from a point in the receptacle below the exposed surface of the body of slurry, e. with the surface of the body of slurry in the receptacle exposed to superatmospheric gaseous pressure, and the withdrawn slurry exposed to atmospheric pressure controlling the rate of flow of slurry through the conduit to obtain a flow rate through the conduit which will maintain the of the exposed surface of the slurry in the receptacle within a range of levels above the point of withdrawal of the slurry from the receptacle and below a point at which the receptacle will overflow, f. passing withdrawn slurry to a slurry processing step, g. predetermining an upper limit and a lower limit for the level of the exposed surface of the body of slurry in the receptacle, h. increasing the gaseous pressure on the exposed surface of the body of slurry when the level of the body of slurry reaches the upper limit to increase the pressure differential between the pressure on the surface of the body of slurry and atmospheric pressure and increase the rate of flow of slurry drawn off from the receptacle, and i. stopping the withdrawal of slurry from the receptacle when the level of the body of slurry in the receptacle reaches the lower limit.

49. Method for collecting dry dust and handling the same comprising a. separating dust from dust-laden gases in a chamber, b. passing the dust from the chamber through a conduit into a receptacle, the gases in the chamber, the conduit and the receptacle being under superatmospheric pressure, c. forming a slurry of dust in water and collecting slurry in the receptacle, d. adding water to the receptacle for the formation of a slurry, e. withdrawing slurry from the receptacle into the ambient atmosphere through a second conduit from a point in the receptacle below the exposed surface of the body of slurry, f. with the surface of the body of slurry in the receptacle exposed to superatmospheric gaseous pressure, and the withdrawn slurry exposed to atmospheric pressure controlling the rate of flow of slurry through the second conduit to obtain a flow rate through the second conduit which will maintain the level of the exposed surface of the in the receptacle within a range of levels above the point of withdrawal of the slurry from the receptacle and below a point at which the receptacle will overflow, g. passing withdrawn slurry to a slurry processing step, h. predetermining an upper limit and a lower limit for the level of the exposed surface of the body of slurry in the receptacle, i. closing the first claimed conduit when the level of the body of slurry reaches the upper limit, and j. stopping the withdrawal of slurry from the receptacle through the second conduit when the level of the body of slurry in the receptacle reaches the lower limit.

* * * * *

UNITED STATES PATENT OFFICE
CERTIFICATE OF CORRECTION

PATENT NO. : 3,879,179
DATED : April 22, 1975
INVENTOR(S) : Charles R. Chinnock and James B. Kaminski It is certified that error appears in the above-identified patent and that said Letters Patent are hereby corrected as shown below:

Column 1, line 58, "handling" should be -- holding tank --.
Column 2, line 26, "conduits" should be -- conduit --.
Column 2, line 35, "conduit 33" should be -- conduit 32 --.
Column 2, line 57, "penetration" should be -- prevention --.
Column 7, line 61, "lines" should be -- line --.
Column 8, line 11, "reversed" should be -- reserved --.
Column 10, line 3, "2" should be -- 7 --.
Column 10, line 12, "2" should be -- 7 --.
Column 10, line 17, "2" should be -- 7 --.
Column 10, line 23, "2" should be -- 7 --.
Column 11, line 38, "j" should be -- 1 --.
Column 13, line 42, "me" should be -- same --.
Column 14, line 10, after "in" (second occurrence) insert -- which --.
Column 15, line 31, "gaseouss" should be -- gaseous --.
Column 15, line 56, "repreating" should be -- repeating --.
Column 17, line 3, after "the" and before "in" insert -- slurry --.

Signed and Sealed this second Day of December 1975

[SEAL]

Attest:

RUTH C. MASON
Attesting Officer

C. MARSHALL DANN
Commissioner of Patents and Trademarks